March 22, 1938.  S. E. MILLER  2,112,041
METHOD OF AND APPARATUS FOR HUMIDIFYING
Filed Aug. 29, 1936
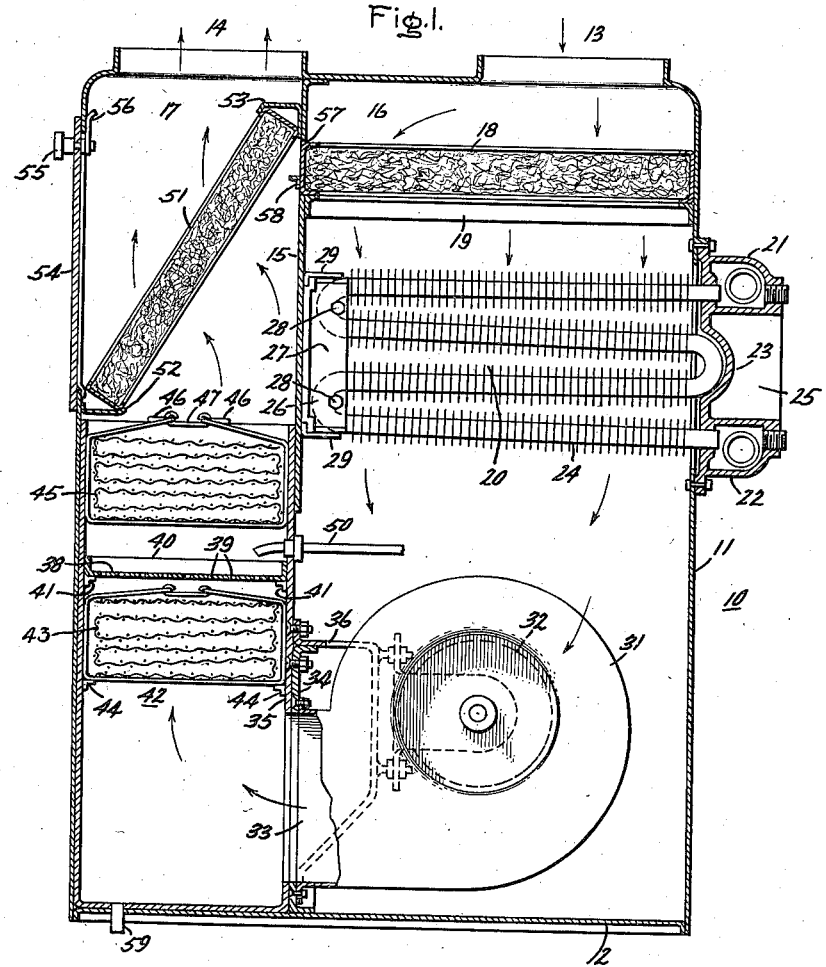
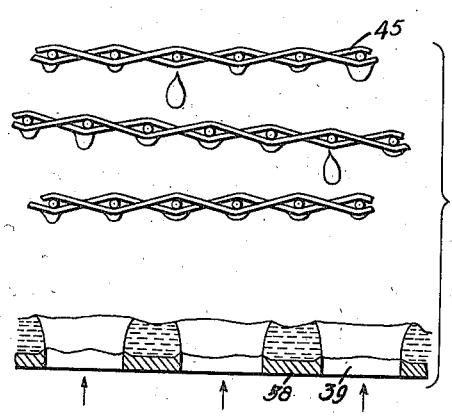
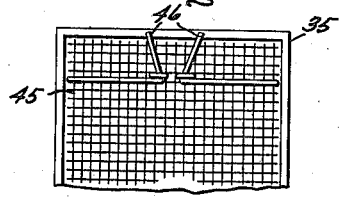
Inventor:
Sidney E. Miller,
by Harry E. Dunham
His Attorney.

Patented Mar. 22, 1938

2,112,041

UNITED STATES PATENT OFFICE 2,112,041

METHOD OF AND APPARATUS FOR HUMIDIFYING

Sidney E. Miller, Bloomfield, N. J., assignor to General Electric Company, a corporation of New York Application August 29, 1936, Serial No. 98,539

7 Claims. (Cl. 261—95)

My invention relates to a method of and apparatus for humidifying air.

An object of my invention is to provide a novel method of humidification which utilizes both a heat transfer from the air to water as sensible heat and heat transfer from water to air as latent heat.

Another object of my invention is to provide a new method of humidification which consists in heating the air, passing it in intimate heat transfer relation with but out of evaporating contact with a sheet of water which may be heated but has become cooled by evaporation and obtaining thereby transfer of heat from the air to water as sensible heat, and finally passing it in close contact through a multiplicity of suspended globules of water from the sheet and obtaining thereby transfer of heat from the water to air as latent heat of evaporation with a resultant cooling of the water globules.

A further object of my invention is to provide a method of humidification in which the water is recirculated over and over in order to obtain an optimum latent heat transfer therefrom and after such recirculation is suspended in globular form at uniformly spaced distances in the path of the air stream and is finally drained from the humidifier.

Another object of my invention is to provide an improved and more efficient humidifier apparatus in which water supplied thereto is recirculated by air flow alone so that only a relatively small amount of water and a minimum of apparatus is required to furnish a maximum amount of humidification.

Yet another object of my invention is to provide an improved humidifier requiring only a relatively small amount of water and in which the transfer of heat from the water to the air as latent heat and from air to water as sensible heat is considerable.

Humidification of air has been a problem for many years and devious methods and apparatus for obtaining satisfactory humidification have been devised. One of the problems confronting those skilled in the arts, and a problem that is probably more serious now than formerly, is the increase in utilization of water in modern air conditioning. Although there is enough water to supply present air condition requirements, a more efficient use of available water would be welcome.

In air conditioning, humidification of the air is caused by evaporation of water in contact with the air. In every such contact of air with water there is theoretically some direct sensible heat exchange as well as evaporation, regardless of the size of the water particles, assuming, of course, that the air is not saturated and that there is a temperature differential between the air and the water. However, even with the air temperature appreciably greater than the water temperature, the tendency of the relatively dry hot air to pick up latent heat from the water is approximately one hundred times greater than its tendency to transfer sensible heat to the water. Thus in air conditioning, humidification ordinarily results in a transfer of heat from water to air at a substantially constant temperature as latent heat irrespective of any temperature differential between the air and the water. But for a more efficient and effective humidification it is desirable to provide for a maximum transfer of heat from air to water as sensible heat, that is, the air temperature decreases in the process.

An improved humidifying method and apparatus utilizing both heated water and heated air is disclosed and claimed in the copending application of C. C. Bailey, Serial No. 733,077, filed June 29, 1934, issued as Patent 2,092,630 on Sept. 7, 1937 and assigned to the assignee of the present application. The humidifier therein disclosed comprises a wire screen mesh having a mesh of such size that heated water distributed thereover accumulates in globules at the intersections of the screen over which the heated air is passed without materially decreasing its temperature. Because of the multiplicity of globules so formed a high rate of evaporation is obtained and consequently a more efficient humidification is possible.

Since heat is always absorbed in the process of humidification, it is necessary in air conditioning to provide a continuous supply of heat from some source in order continuously to carry on the humidification process. Ordinarily heated water is relied upon as the principal source of heat. Hence ordinarily a plentiful supply of heated water is required.

In accordance with my present invention, the heat required to carry on the humidifying process is supplied largely by heating the air. Furthermore, special provision is made for transferring the heat from the air to a sheet of water as sensible heat so that it later may be returned from the water to the air as latent heat. Thus my method of humidification combines the evaporative transfer of latent heat from the water to the air with a special method and means for transferring sensible heat from the air to the sheet of water in order to decrease the need for a plentiful supply of heated water and improve the efficiency of humidification. More specifically I utilize wire screens of the type disclosed in the above mentioned Bailey application for effecting the transfer of latent heat from the water to the air in combination with a perforated plate supporting a sheet of water with the heated air passing in intimate contact with the plate and through the perforations thereof so as to effect the transfer of sensible heat from the heated air to the water but out of evaporative relation therewith. The wire screens are formed into two multi-layer stacks, one arranged below the perforated plate and the other above it. Heated water is supplied to the upper surface of the perforated plate and is carried upwardly by the heated air in small particles onto the upper screen stack, the heated air creating a number of jets as it breaks through the water at the perforations of the plate. When the level of the sheet of water on the plate reaches an appreciable height, a little of the water is then discharged downwardly at random around the edges of the perforations to the lower screen stack. Globules of water thus are suspended on both stacks while the extended sheet of water is in good sensible heat transfer relation with the perforated plate through which the heated air is passed. Thus evaporative humidification with transfer of latent heat from the water to the air occurs in the regions of the stacks whereas sensible heat transfer from the heated air to the water occurs at the plate.

The upper stack also acts as a baffle and prevents carriage of water particles to the enclosure by the air stream. The particular stack and plate arrangement described above also effects a very efficient recirculation of the water before it passes through the perforations to the lower screen stack. The water from the plate is carried by the air onto the upper screen stack where it is suspended in globular form at the intersections of the screen. As the globules grow in size they rapidly lose heat by evaporation and finally drop back onto the plate and are again forced back onto the screen by the air flow. A constant recirculation of the water takes place and a maximum latent heat transfer from the water to the air occurs because the water is used over and over again. As a result when the water passes through the perforations to the lower screen stack where a further latent heat transfer occurs before the water passes to the drain, the drain water temperature is very low.

A humidifier constructed in accordance with the above mentioned principles has proved very efficient in operation and has shown a considerable saving in the amount of water needed to require evaporation of a certain amount of water. Comparing a humidifier constructed in accordance with the present principles with one of the aforementioned Bailey screen type but, however, with the air relatively unheated, I have found that the present type furnishes 130% evaporation with 34% water flow and a 10° F. reduction in drain water temperature. In humidifiers the drain water temperature can never be less than the wet bulb temperature of the air discharged from the humidifier. This fact establishes a lower temperature limit and in the operation of my humidifier I have found that the drain water temperature is not over 2° F. over the wet bulb temperature of the air discharged during normal operation.

A comparison between the relative efficiency of the Bailey screen type humidifier with relatively unheated air and a humidifier constructed in accordance with my invention may be obtained from the following table:

| Operating conditions | Humidifier built in accordance with present invention | Screen drip humidifier |
|---|---|---|
| Boiler water temp | 200° F. | 200° F. |
| Temp. of air to humidifier | 125° F. | 70° F. |
| Temp. of water to humidifier | 125° F. | 180° F. |
| Temp. of air leaving humidifier | 95° F. | 70° F. |
| Humidifier water flow | 34#/hr. | 100#/hr. |
| Evaporation rate | 12.5#/hr. | 9.5#/hr. |
| Drain water temp | 75° F. | 85° F. |

From the above tabulation it may be seen that by using air heated to the same temperature as the water supplied to the humidifier and one-third of the amount of water I have been able to obtain approximately one and one-third times the humidification. The increased efficiency is due in part, at least, to the fact that the air is heated. However, the water used in my present arrangement is recirculated, that is, it is first carried upwardly to the screen stack, falls down the spray plate and in large part is again projected upwardly. This effect accounts to some extent for the good sensible heat transfer from air to water at the spray plate and for the low drain water temperature since the extraction of latent heat from the water by the air insures a low water temperature and high temperature difference between water and air at the spray plate due to the mixing of the low temperature water from the screen stack with the heated water, which temperature difference increases the sensible heat transfer from the air to the water.

Further objects and advantages of my invention will become apparent as the following description proceeds, and the features of novelty which characterize my invention will be pointed out with particularity in the claims annexed to and forming part of this specification.

For a better understanding of my invention, reference may be had to the accompanying drawing in which Fig. 1 is a front elevation, partially in section, of a conditioner provided with a humidifier constructed in accordance with my invention; Fig. 2 illustrates the mode of suspending the upper screen stack within the humidification chamber and Fig. 3 is a partial cross-section, considerably enlarged, of the spray plate and upper screen stack.

Referring to Fig. 1, reference numeral 10 indicates an air conditioner unit comprising an outer unitary cabinet structure 11 forming with bottom 12 an enclosed structure. The top of the cabinet is provided with an air inlet 13 and a discharge outlet 14. The conditioner may be supplied with air through inlet 13 either from the enclosure to be conditioned or from outdoors or suitable proportions of both in accordance with well known principles.

The cabinet is provided in its interior with a downwardly extending partition 15 defining an air inlet passage 16 and an air outlet passage 17. In the air inlet passage is positioned an air filter 18 of any well-known type, slidably supported on suitable means such as flange 19. Within the inlet passage is also positioned a novel fin type heat exchanger unit 20 forming the basis of my contemporaneously filed application, Serial No. 98,538, also assigned to the assignee of the present application.

The heat exchanger unit 20 comprises a pair of headers 21 and 22 formed as an integral unit having between them a recessed curved portion 23. The headers support the ends of a plurality of finned tubes 24 bent into a series of U-shaped convolutions. The header end loops 25 of the tubes are supported in the recessed portion 23 and the return end loops 26 are held in assembled relation by a runner assembly comprising channel members 27 fitting over the outer tubes and secured to each other by bolts 28. The runner assembly is supported by flanges 29 secured to the downwardly extending partition 15.

Air is drawn down through the inlet passage by suitable air circulating means such as blower 31 and a driving motor 32. The blower casing is formed with a discharge passage 33 suitably fastened by screws to flanged member 34 surrounding the passage and in turn suitably fastened to the humidifier structure 35. The humidifier structure also supports by means of suitable bracket 36 the driving motor 32.

The humidifier structure comprises the unitary container 35 which is enclosed on all sides with the exception of its top, an opening corresponding with the discharge passage 33, and a drain opening 59. Within the container are placed a perforated spray plate 38 formed with perforations 39 on the horizontal bottom portion and with upstanding edges 40. It is suitably supported by means of flanges 41 welded or otherwise secured to the inner surface of container 35. Below the spray plate is a first screen stack 42 formed of a number of layers of screen having a mesh of substantially .25 inch and therefore possessing, as disclosed in the previously mentioned Bailey application, the property of collecting and suspending globules of water at the intersections of the screen as illustrated more clearly in Fig. 3. The screen stack is very simply made by simply folding a longitudinal length of screen to form a number of U-shaped convolutions held in shape by surrounding tie wires 43 (only one of which is shown) and suspending the resulting stack on a pair of flanges 44.

The upper screen stack 45 is formed in substantially the same manner as the lower screen stack and is also held together by tie wires 43 extending substantially therearound and formed with projections 46 extending substantially at right angles therefrom as illustrated more clearly in Fig. 2. These projections form a simple means for holding the stack together and for suspending the stack from the top of the humidifying chamber 35. The ends of the tie wire are held in fixed position by a wire lock 47 which may be readily slipped over projections 46 by moving the latter toward each other and slipping the loop thereabout. A screen stack constructed in this manner is very simple and economical to build and may be readily assembled in place.

Water is supplied to the humidifier through an inlet 50 extending through a side wall of the humidifying chamber to a point above the spray plate. The supply of water to the humidifier may be suitably controlled by either manual or automatic means such as a humidity responsive controller operating a valve in the conduit (not shown).

In the outlet passage 17 is positioned a second filter 51 suitably supported by flanges 52 and 53 attached to the container and partitions 11 and 15, respectively. The front wall of the conditioner cabinet is provided with a removable door 54 which may be removed by operation of knob 55 and latch 56. The arrangement disclosed provides a simple arrangement whereby the filter 51 may be removed from within the conditioner for cleaning whenever that is necessary, and filter 18 in the inlet passage may be removed through an opening 57 provided on the inner partition 15. The filter 18 is slidably mounted on the flanges 19 and after removal of filter 51, filter 18 may be moved from the position in which it is shown by handle 58.

In operation the conditioner illustrated may be utilized for heating alone or for heating and humidifying both. When heating alone is desired either hot water or steam is supplied to the heat exchanger unit 20 through an inlet header 21 and then flowing through the finned heat exchanger element to the outlet header 22.

When humidification is desired water is supplied to the spray plate 38 through conduit 50 at a predetermined rate, either under manual control or in response to control exerted over suitable regulating means by humidity responsive means in the enclosure being conditioned. The blower 31 is designed to have a capacity sufficient to create an air velocity great enough to force the air through the perforations on spray plate 38 and maintain the water level on the plate at some height as indicated in the enlarged illustration of Fig. 3. When the pressure of the air is overbalanced by the water pressure, water is discharged at random around the edges of perforations on the spray plate to the screen stack below. The discharged water is suspended in globular form at the various intersections of the screen at a plurality of levels determined by the positions of the various layers of screen. The water thereafter falls to the bottom of the humidification chamber 35 and is drained through a drain 59. The air passing through the spray plate comes in very intimate contact with the water on the plate and creates a plurality of water jets one at each perforation, and carries particles of water a substantial distance above the surface of the water on the plate. The water thus carried upwardly is deposited upon the upper screen stack and there forms into globules suspended from the intersections of the wire after the fashion illustrated in Fig. 3. After a particular globule grows to a predetermined size the force of gravity overcomes the force exerted by the air stream and the globule drops from a higher screen onto a lower one and finally returns to the body of water on the plate 38. Thereafter, the water in the particular drop, after mingling with the water on the plate, may either fall in part to the lower screen stack or again be returned to the upper screen stack. This arrangement provides a circulation of water not only downwardly from the spray plate onto the lower screen stack but also provides a local circulation of water from the spray plate to the upper screen stack. The constant recirculation of the water from the plate to the upper screen stack results in an excellent sensible heat transfer from air to water at the spray plate and a low drain water temperature since the extraction of latent heat from the water by the air in the screen stacks insures a low water temperature and the high temperature difference between water and air at the spray plate, which temperature difference increases the sensible heat transfer from the heated air to the water through the plate with the air out of evaporative contact with the water.

With boiler water temperature of 200° flowing through the heat exchange unit and utilizing water at a temperature of 125° and flowing at the rate of 34 pounds per hour, I have been able to evaporate water at the rate of 12.5 pounds per hour.

The temperature of the air supplied to the humidifier through the fan discharge 33, under these conditions, was 125° and the temperature of the air leaving the humidifier was 95°. At the same time, the drain water temperature was 75° representing a temperature value not over 2° F. over the wet bulb temperature of the air discharged from the conditioner.

As explained more fully in the above mentioned Bailey application, the humidifying action in the screen stack is principally an evaporative one. The suspension of a large number of globules of water at the intersections of the screen provides a very large area of contact between air and water and results in a high rate of evaporation.

In my present invention I utilize the advantageous results of this evaporative humidification and improve upon it by utilizing the constant recirculation of water between the spray plate and the upper screen stack, thereby obtaining an excellent combination of evaporative humidification with the good sensible heat transfer from the heated air to the shallow body of water supported upon the spray plate.

What I claim as new and desire to secure by Letters Patent of the United States, is:

1. The method of humidifying air which comprises passing air through a body of water at a rate sufficiently high to carry particles of water above the surface of the body and to permit a slow discharge of water below said body, temporarily suspending in the air stream the particles in globular form in substantially uniformly spaced relation above the surface of the body, and suspending the particles of water discharged below said body in substantially uniformly spaced relation below the body of water.

2. The method of humidifying air in a duct containing a perforated member which comprises supplying water at a constant rate above said member to form thereon a body of water, passing air through said member and water at a velocity sufficient to carry particles of water a substantial distance above the surface of the water, and temporarily suspending the particles of water in globular form in substantially uniformly spaced relation in the air stream above the surface of the water and creating thereby a local circulation of water.

3. The method of humidifying air in a duct containing a perforated member which consists in supplying water at a constant rate above said member to form thereon a body of water, passing air through said member and water at a velocity sufficient to carry particles of water a substantial distance above the surface of the water and to permit a slow discharge of water below said member through random perforations, suspending the particles of water in globular form in substantially uniformly spaced relation in the air stream above the surface of the body, and suspending the discharged water in globular form in substantially uniformly spaced relation in the air stream below said member.

4. In air conditioning apparatus of the type containing an air passage, the combination including a perforated member horizontally mounted in said passage, means for supplying water above said member to form thereon a body of water, means for circulating air through said passage at a velocity sufficient to carry particles of water a substantial distance above the surface of the water and permit a slow discharge of water below said member through random perforations, means for suspending the particles of water in the air space above the surface of the body, and means for suspending the discharged water in the air stream below said member.

5. In air conditioning apparatus of the type containing an air passage, the combination including a perforated member horizontally mounted in said passage, means for supplying water above said member to form thereon a body of water, means for circulating air through said passage at a velocity sufficient to carry particles of water a substantial distance above the surface of the water and permit a slow discharge of water below said member through random perforations, and means for suspending the particles of water in the air space above the surface of the body.

6. In air conditioning apparatus of the type containing an air passage, the combination including a perforated plate horizontally mounted in the passage, means for supplying water upon said plate to form thereon a body of water, means for circulating air through said passage at a velocity sufficient to carry particles of water a substantial distance above the surface of the water and to permit a slow discharge of water below said plate to random perforations thereon, means including a multi-layer wire mesh screen for suspending the particles of water carried by the air stream in globular form in substantially uniform spaced relation in the air stream above said plate.

7. In air conditioning apparatus of the type containing an air passage, the combination including a perforated metallic plate horizontally mounted in the passage, means for supplying water upon said plate to form thereon a body of water, means for circulating air through said passage at a velocity sufficient to carry particles of water a substantial distance above the surface of the water and to permit a slow discharge of water below said plate to random perforations thereon, means including a multi-layer wire mesh screen for suspending the particles of water carried by the air stream in globular form in substantially uniform spaced relation in the air stream above said plate, and means including a second multi-layer wire mesh screen suspended below said plate for suspending the particles of water discharged in substantially uniformly spaced relation in said package.

SIDNEY E. MILLER.